United States Patent
Tine et al.

(10) Patent No.: US 9,129,441 B2
(45) Date of Patent: Sep. 8, 2015

(54) LOOKUP TABLES FOR TEXT RENDERING (75) Inventors: Blaise Pascal Fonkou Tine, Lynnwood, WA (US); Christopher Nathaniel Raubacher, Redmond, WA (US); Anthony John Rolls Hodsdon, Seattle, WA (US); Miles Mark Cohen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 470 days.

(21) Appl. No.: 12/819,597

(22) Filed: Jun. 21, 2010

(65) Prior Publication Data

US 2011/0310115 A1     Dec. 22, 2011

(51) Int. Cl.
G09G 5/00      (2006.01)
G06T 11/40     (2006.01)
G06T 11/20     (2006.01)

(52) U.S. Cl.
CPC .............. *G06T 11/40* (2013.01); *G06T 11/203* (2013.01); *G09G 2340/0457* (2013.01)

(58) Field of Classification Search
CPC combination set(s) only.
See application file for complete search history.

(56) References Cited

U.S. PATENT DOCUMENTS

| 6,108,014 | A | 8/2000 | Dye |
| 6,339,426 | B1 | 1/2002 | Lui et al. |
| 6,342,890 | B1 | 1/2002 | Shetter |
| 6,529,284 | B1 | 3/2003 | Ganapathy |
| 6,927,780 | B2 | 8/2005 | Guleryuz |
| 7,358,975 | B2 | 4/2008 | Wetzel |
| 8,212,838 | B2 | 7/2012 | Preetham |
| 2004/0189639 | A1* | 9/2004 | Perry et al. ................... 345/441 |
| 2005/0035976 | A1 | 2/2005 | Ecob et al. |
| 2005/0212806 | A1* | 9/2005 | Koselj et al. ................. 345/522 |
| 2005/0243101 | A1* | 11/2005 | Sasaki et al. ................. 345/601 |
| 2007/0206013 | A1 | 9/2007 | Brown Elliott |
| 2007/0257934 | A1* | 11/2007 | Doermann et al. ........... 345/606 |
| 2009/0027416 | A1 | 1/2009 | Barone |
| 2009/0160867 | A1 | 6/2009 | Grossman |
| 2010/0001999 | A1* | 1/2010 | Everitt et al. ................. 345/426 |
| 2010/0141670 | A1 | 6/2010 | Cohen |

FOREIGN PATENT DOCUMENTS

| JP | 2001100725 A | 4/2001 |
| JP | 2003520980 A | 7/2003 |
| JP | 2004514994 A | 5/2004 |
| JP | 2010020764 A1 | 1/2010 |

OTHER PUBLICATIONS

International Search Report, PCT/US2011/040113, dated Jun. 12, 2011, 8 pages.

(Continued)

*Primary Examiner* — Leon T Cain, II
(74) *Attorney, Agent, or Firm* — Bryan Webster; Kate Dakos; Micky Minhas (57) ABSTRACT

Systems and methods are provided for improved filtering and correcting of glyphs on a GPU. The computational intensity required for filtering and/or rendering can be reduced by pre-calculating some or all of the calculations needed for converting coverage data into corrected pixel values. Additional efficiencies may be realized in some embodiments by transferring data from a CPU to a GPU in an improved format. The improvements can be realized in a variety of graphics formats.

20 Claims, 7 Drawing Sheets

(56) References Cited

OTHER PUBLICATIONS

Hardware accelerating Firefox—Published Date: 25, 2010 http://blog.mozilla.com/joe/2010/05/25/hardware-accelerating-firefox/.
Font rendering on a GPU-based raster image processor—Published Date: 2009 http://www.hpl.hp.com/techreports/2009/HPL-2009-181.pdf.
Office Action Issued for China Patent Application No. 201180030909.6, Mailed Date: Sep. 26, 2013, 9 pages.
Second Office Action Issued for China Patent Application No. 201180030909.6, Mailed Date: Mar. 17, 2014, 6 pages.
Chinese Patent Office of China. State Intellectual Property Office of People's Republic of China, Search Report, Sep. 16, 2013, 2 pages, No. CPPH1232306P.
"Office Action Issued in Japanese Patent Application No. 2013-516602", Mailed Date: Mar. 3, 2015, 8 Pages.
Toji, et al., "Fine Type: Hi-Resolution Font Rendering Technology Utilizing a Color LCD Device", In Proceedings of the Visual Computing—Graphics and CAD Joint Symposium 2002, Jun. 20, 2002, pp. 87-92. No translation provided, cited in Japanese Office Action dated Mar. 3, 2015 in Japanese Patent Application No. 2013-516602.

* cited by examiner

LOOKUP TABLES FOR TEXT RENDERING

BACKGROUND

A glyph is an image used to visually represent a character or characters. For example, a font may be a set of glyphs where each character of the font represents a single glyph. However, a glyph may also include multiple characters of a font and vice versa. That is, one character of a font may correspond to several glyphs or several characters of a font to one glyph. In other words, a glyph is the shape of a series of curves that delimit the area used to represent a character or characters. The computer-implemented process used to generate glyph curves and the resulting characters is referred to as text rendering.

Rendering text can be one of the more expensive operations in terms of central processing unit (CPU) usage. One process for rendering text includes the four step process of rasterizing, merging, filtering, and correcting. The rasterizing step includes converting the glyph curves to a bitmap. The format of the bitmap is typically 1-bit-per-pixel (1 bpp) and it may be "overscaled" in one or more directions. For example, the bitmap may be overscaled in the vertical or horizontal direction. Overscaling refers to a process where each bit of data, or texel, used to generate the bitmap is smaller than the pixel used to display the glyph.

The merging step includes merging nearby glyphs to prevent artifacts or undesirable characters. For example, anti-aliasing (including sub-pixel rendering) involves drawing some pixels semi-transparently. Because each glyph may be drawn independently, it is possible for the same pixel to be drawn semi-transparently multiple times in locations where the glyphs overlap. This may result in the pixel appearing too dark. To avoid this, the merging step combines the bitmaps for all the glyphs into a single texture. The filtering and blending steps are performed on the single texture rather than separately for each glyph. Thus, the merging steps combines the individual glyphs to achieve a continuous appearance and ensure there are not overlapping or separated glyphs.

The filtering step takes the merged glyphs and calculates the "coverage" for each pixel. The term coverage refers to determining the necessary intensity or value for each individual pixel used to display the merged glyphs. For example, a pixel that falls completely within the area of the glyph curve would have a 100% coverage. Likewise, a pixel that is completely outside the area of the glyph curve would have 0% coverage. Thus, the coverage value may fall anywhere in between 0% to 100% depending on the particular filtering method used for rendering the glyph.

The correcting step may include sub-pixel rendering to improve the readability of the characters. One example of correcting can involve modifying the coverage for each pixel based on known factors that improve the readability of a glyph. These can include emphasizing or de-emphasizing certain colors and/or pixels within a glyph to avoid appearance artifacts when a glyph is displayed. Another example of correcting can be blending of pixels to exploit the pixel structure of a Liquid Crystal Display (LCD). Specifically, sub-pixel rendering is possible because one pixel on an LCD screen is composed of three sub-pixels: one red, one green, and one blue (RGB). To the human eye these sub-pixels appear as one pixel. However, each of these pixels is unique and may be controlled individually. Thus, the resolution of the LCD screen may be improved by individually controlling the sub-pixels to increase the readability of text displayed on the LCD.

One method to render the text is to perform the first three steps on the CPU. That is, the rasterizing, merging, filtering steps are performed on the CPU and the blending step is preformed on the graphic processing unit (GPU). In terms of CPU usage, the merging and the filtering steps are the most computational intensive.

SUMMARY

In various embodiments, systems and methods are provided for improved filtering and correcting of glyphs on a GPU. The computational intensity required for filtering and/or rendering can be reduced by pre-calculating some or all of the calculations needed for converting coverage data into corrected pixel values. Additional efficiencies may be realized in some embodiments by transferring data from a CPU to a GPU in an improved format. The improvements can be realized in a variety of graphics formats.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

After a bitmap of a glyph is determined, rendering text based on the glyph bitmap can require completion of several tasks. One can include transferring coverage data for rendering from a central processing unit (CPU) to a graphics processing unit (GPU). Another task can be unpacking the transferred data into a recognizable format. A third task can be converting the coverage data into pixel information. Additionally, various corrections can be applied to the pixel to improve the final display of the text. Rendering text in an efficient manner can involve balancing the memory requirements and processing requirements for displaying pixels based on coverage data.

Data Transfer and Unpacking

Transferring coverage data from the CPU to the GPU is one possible bottleneck during text rendering. Conventionally, coverage data has been transferred in a simple format, such as transferring one-bit-per-pixel (1 bpp) data by using a separate byte to hold each bit of data. Using a byte to hold each bit of 1 bpp data simplifies the unpacking of data transferred to the GPU, as each bit is located in a separately addressable location. However, this type of data transfer can be inefficient from a memory standpoint, as the majority of data space in each byte is not used. This inefficiency can be exacerbated by any oversampling used in representing the pixel data. For example, one common type of oversampling for text data (such as ClearType data) is to use a 6×1 coverage data format for each pixel. In a 6×1 format, 10 total bits are needed to represent three channels of data for the pixel. The channels typically correspond to the red, green, and blue components of a pixel. Thus, when transferring data in a 1 bpp format with a separate byte for each bit, 10 bytes are needed to transfer the red, green, and blue components for the pixel. In this type of data transfer, the bits necessary to specify a pixel are easily assembled, as the 10 bits can be retrieved from their individual bytes that do not include any other data.

In various embodiments, an improved method is provided for transferring and/or unpacking coverage data. Instead of transferring the 1 bbp data with each bit in a separate byte, data can be passed into the GPU using a higher data density format, such as 8-bits-per-pixel. This increases the amount of data transferred in each byte, which can reduce the overall memory usage on the GPU.

Figure 6:
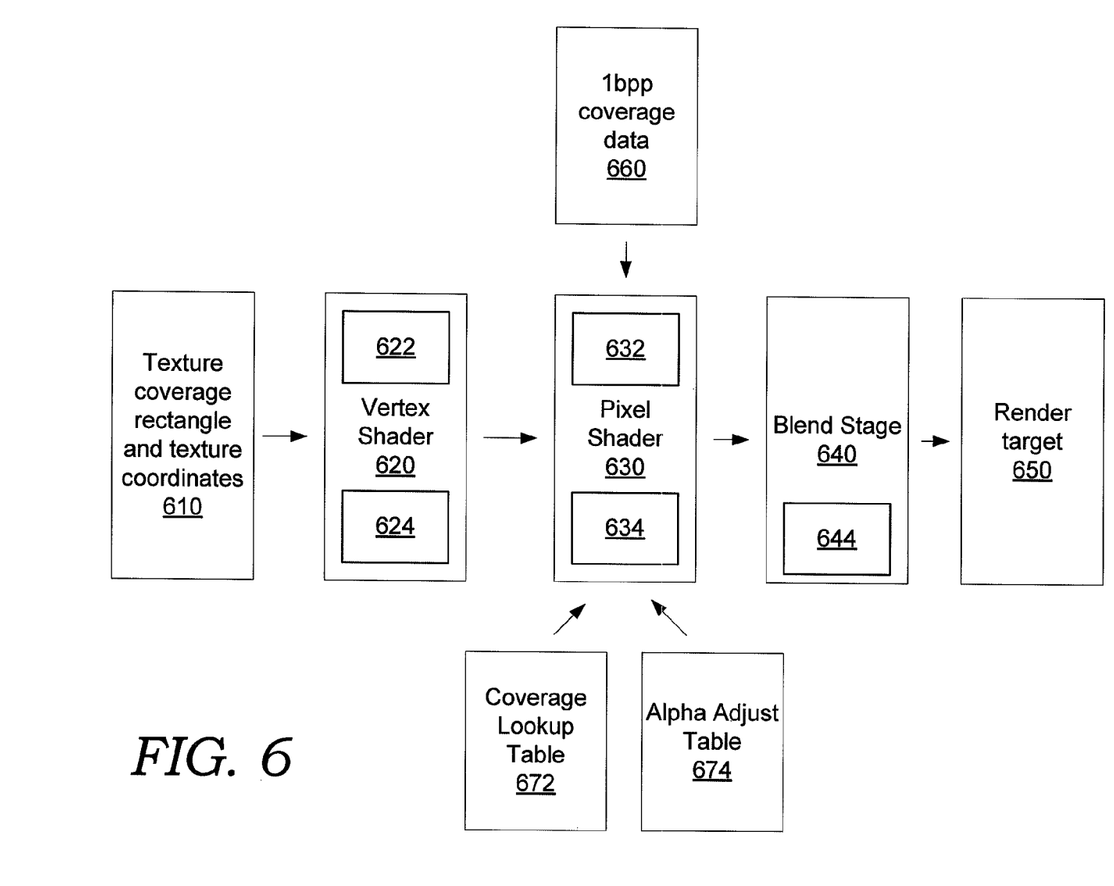
FIG. 6 schematically shows another example of components for rendering text pixels.
Figure 7:
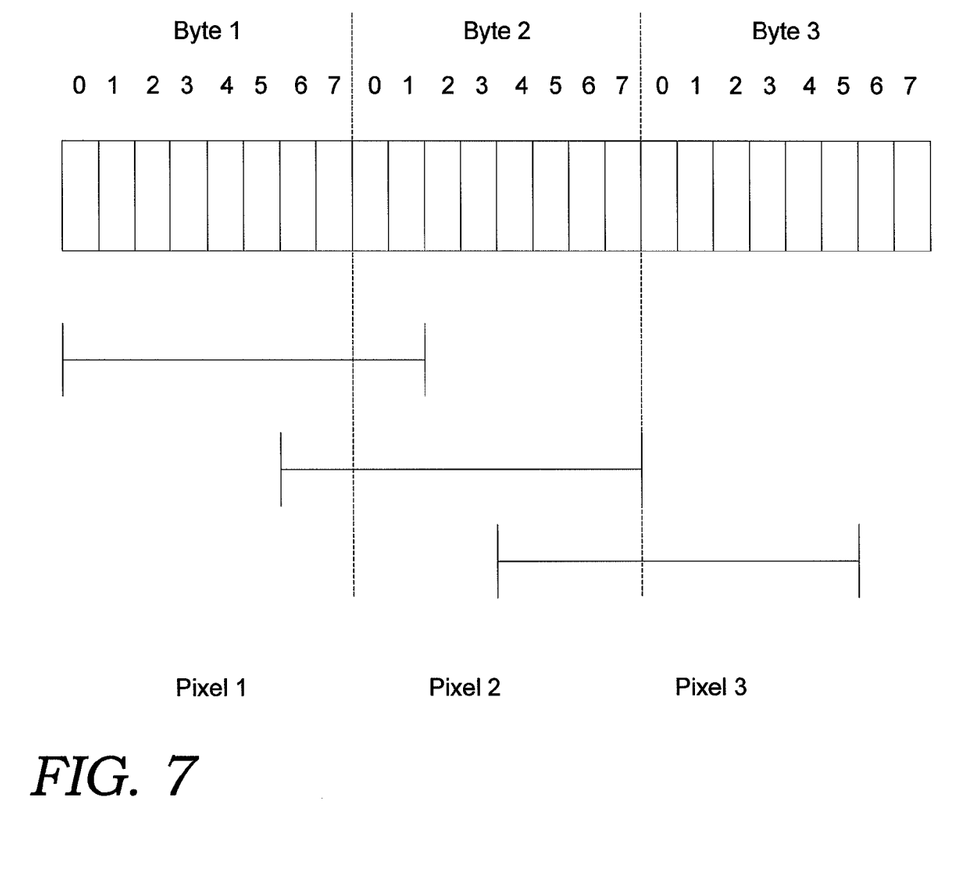
FIG. 7 shows the alignment of 6×1 pixel coverage data stored in an 8-bits-per-byte format.

Transferring data in a higher data density format can require additional processing to unpack the data. Due to the higher density format, the information for each pixel may not cleanly align with the boundaries of individual bytes. For example, 6×1 coverage data includes 10 bits of information per pixel, while an 8 bpp data format includes only 8 bits per byte. Additionally, for glyphs corresponding to ClearType text, each pixel overlaps with an adjacent pixel by 4 bits due to overlap in pixel information for the ClearType filter. As a result, for an example of 1 bpp ClearType text transferred using an 8 bpp packing scheme, each byte of transferred data can include information for more than one pixel, and determining the display value for a pixel can require data from more than one byte. This situation is shown in FIG. 6, which shows an example of how 6×1 coverage data is stored in an 8 bpp format.

The method for unpacking the coverage data can depend on the type of display hardware that is available. For a hardware display using the DirectX 10 format (Dx10), bit shifting instructions are available. This means that any pixel information that is needed can be obtained by accessing the two bytes of data that contain the 10 bits corresponding to a pixel. Bit shifting instructions can then be used to select the bits within each byte that correspond to the pixel of current interest. The bits can then be assembled to form a 10-bit number corresponding to the coverage data for the pixel. Similar manipulations can be used for other data formats, based on the relationship between the number of bits in a pixel relative to the packing of the coverage information.

Additional operations may be needed for hardware that does not include bit shifting functionality. For example, DirectX 9 (Dx9) does not support bit shifting operations. Instead, information sampled by the pixel shader in Dx9 is returned as floating point value between 0 and 1. In order to extract the pixel data in this situation, the value stored in each byte can be multiplied by 255, and then rounded to an integer. The next operation then depends on the portion of the original byte that contains the relevant bits for a desired pixel. If a right bit shift is desired, the integer can be multiplied by a negative power of two. A "floor" operation can then be used to remove the undesired bits, which are all to the right of the decimal point after the multiplication. If a left bit shift is desired, the integer can be multiplied by a positive power of two, and a "frac" operation can be used to remove the undesired bits which are located to the left of the decimal point. Multiplying by a negative power of two can then be used to return the remaining bits to the original position.

Bit Assembly and Data Lookup

Based on the above, a higher density data format can be used to transfer 1 bbp format data to a GPU. After identifying the bits corresponding to a pixel, the bits can be assembled to form a single number. For example, in a 6×1 format, the bits can be assembled to form a 10-bit number. A 6×5 format could be assembled to form 5 10-digit numbers. More generally, the number of bits corresponding to a pixel can be assembled. Note that a simple arithmetic add operation may be sufficient to assemble the bits, as the bit shifting (or power of two multiplications) describe above can be used so that there is no overlap between the bits from two original 8-bit bytes.

The assembled bits can then be used to determine a pixel value. In an example using 6×1 oversampled data, the separate red, green, and blue values can be calculated for each pixel as it is unpacked in a conventional manner. However, since there are only a relatively small number of possible combinations (1024 for a 10-bit number), applicants have determined that it can be more efficient to calculate the value for any possible pixel ahead of time. The 10-bit value for a pixel can then be used as an index to look up the correct value in a table. Thus avoids repeating the same calculation multiple times, thus reducing the processing burden on the GPU.

For a data format such as 6×1 data, the total number of bits per pixel (10) results in a manageable number of combinations (1024). However, some oversampling formats result in larger data amounts per pixel, which can complicate the determination of a pixel value. For example, another available oversampling format is 6×5 data, which effectively incorporates five columns of 6×1 data. Based on current computational capabilities for general purpose computing devices, it is not practical to pre-calculate the $2^{50}$ combinations that would be needed to directly construct a lookup table using a 50-bit index. For 6×5 format data, this can be addressed by treating the data as five rows of 10-bit data. Lookup tables can be computed for uncorrected pixel values for the 10-bit coverage data rows as described above. The five rows of coverage data can then be vertically filtered to combine the data into a single pixel value. Optionally, this latter operation can be handled by a conventional pixel shader. Note that based on the above, the term "pixel value" can refer to either a complete pixel value or a partial pixel value that can be combined with other partial values to form a complete value. In some situations, a partial pixel value will be referred to when specifically describing a pixel value that is combined with other partial values to form a complete value. An example of a partial pixel value can be a value based on one row of 6×5 oversampled coverage data.

Pixel Correction Factor

The above methods can allow for efficient transfer of 1 bpp coverage data to a GPU, and then efficient calculation of pixel values based on the coverage data. By itself, this can provide memory and/or computational time savings for a GPU. However, additional improvements are possible if some or all of the pixel correction factors can be incorporated into the lookup table.

For conventional processing of 6×1 coverage data, such as ClearType data, the 10 bits of coverage data are assembled and processed to provide the red, green, and blue pixel information. Based on the values of the pixel information, one or more correction values or factors are then applied to the data. These corrections can be used to improve the appearance of the text formed by the displayed pixels. The corrections can include (enhanced) contrast adjustment, ClearType level adjustment, and alpha corrections. Additionally, an adjustment may be necessary for monitors that use a blue-green-red format for expressing pixel information, as opposed to a red-green-blue format. Conventionally, each of these correction factors is applied to each pixel based on the red, green, and blue channel values in the data, and requires separate additional calculations after determining the uncorrected pixel value.

In some embodiments, one or more of the correction factors applied to pixel values can be pre-calculated and incorporated into the lookup table. Many of the corrections applied to pixel values are fully specified by the assembled coverage data bits. For example, the assembled 10-bit number for 6×1 format coverage data provides sufficient information to determine various corrections that can be applied to the pixel value. Such corrections can include an enhanced contrast correction, a ClearType level adjustment, or an alpha value correction. Since the corrections to the pixel value can also be determined ahead of time, these corrections can also be pre-calculated. This allows the lookup table to store a corrected pixel value, which further reduces the number of calculations required by the GPU.

It is noted that one or more of the correction factors applied to pixels used for text rendering may be variable based on a user or hardware setting. For example, the correction factors applied to a pixel value may be dependent on the background and text colors selected by a user or a contrast setting of a hardware display device. As a result, if corrections to pixel values are included in the lookup table, a new lookup table will be needed each time a change is made that modifies the correction factors. One way to accommodate this can be to have an atlas of lookup tables. For common user and display settings and/or recent combinations of settings, a lookup table can be stored in an atlas of lookup tables. If a new combination of settings is selected that has not been computed before, a new table can be calculated and added to the atlas. In order to conserve memory, the atlas of lookup tables can include a limited number of tables. For example, 20 tables for 10-bit data lookup can be stored in less than 96 kB of space. When a new table is added, one of the tables can be selected for removal, such as the least recently used table.

The data corrections for a pixel value can present an additional challenge for large data formats. For example, data in a 6×5 format requires a total of 50 bits to specify a pixel value. As described above, a lookup table for uncorrected pixel values can be generated by analyzing the data as five 10-bit data rows. However, at least some of the correction factors for pixel value are based all of the oversampling data for a pixel, and cannot be readily separated out for inclusion in 10-bit data table corresponding to a portion of the oversampling data. For example, an enhanced contrast correction for 6×5 pixel values should be calculated and applied after the 10-bit data rows are vertically integrated. For the pixel corrections on larger data formats, one option can be to calculate the corrections in the conventional way based on the data retrieved from the lookup table. Alternatively, in an example related to 6×5 format coverage data, the result of the vertical integration is three grayscale channels corresponding to the red, green, and blue channels of a display monitor. For each of these grayscale channels separately, at least some of the correction data can be stored in an appropriately sized table. Thus, some calculations can be avoided by having lookup tables for some correction values, while conventionally calculating the remaining corrections.

FIG. 6 schematically shows a process flow for display of text pixels according to an embodiment of the invention. In FIG. 6, an expanded view of the process is provided to provide overall context. Texture coverage rectangle and texture coordinates 610 represent the grid that is used for rasterizing text. Vertex shader 620 includes functionality for performing a screen space transform 622 and copying texture coordinates 624. Pixel shader 630 includes functionality for performing a coverage calculation 632 and calculating a correction, such as an alpha adjustment 634. The 1bpp coverage data 660 is processed by pixel shader 630. As part of this processing, some calculations can be replaced by coverage lookup table 672 and alpha lookup table 674. Blend stage 640 includes functionality for performing additional blending, such as ClearType blending 642.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 1:
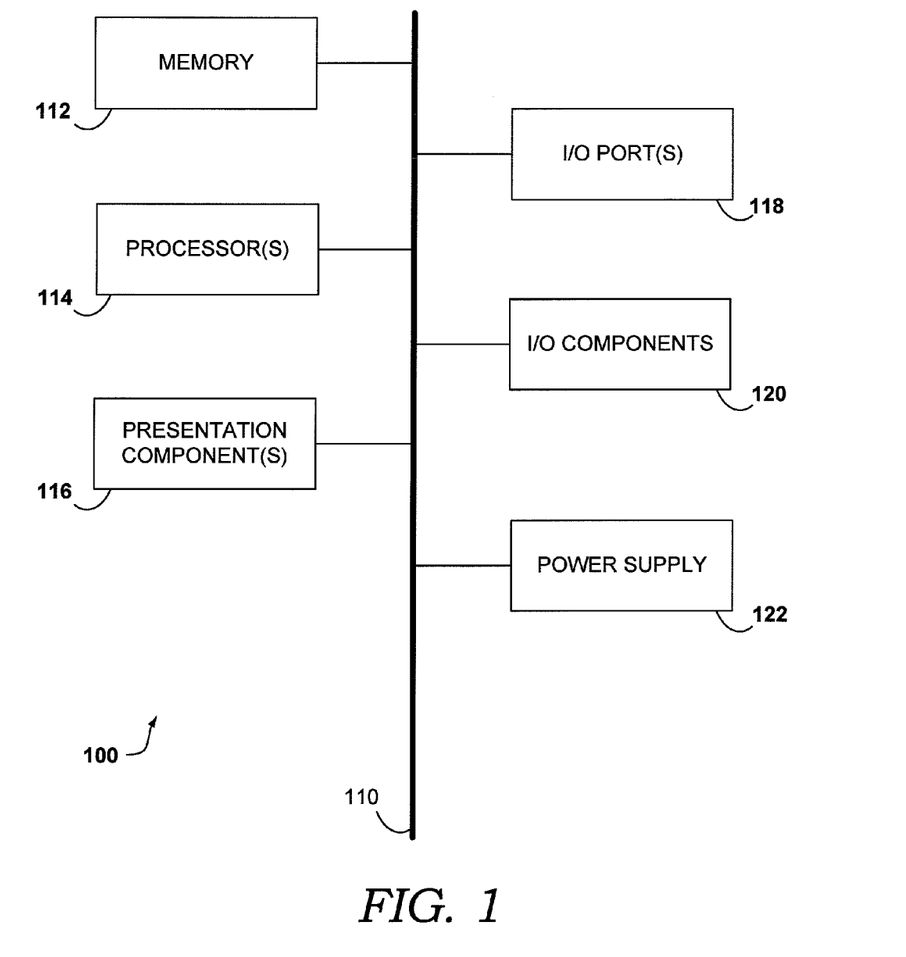
FIG. 1 is a block diagram of an exemplary computing environment suitable for use in implementing embodiments of the present invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In an embodiment the computer storage media can be tangible computer storage media. In an embodiment the computer storage media can be non-transitory computer storage media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
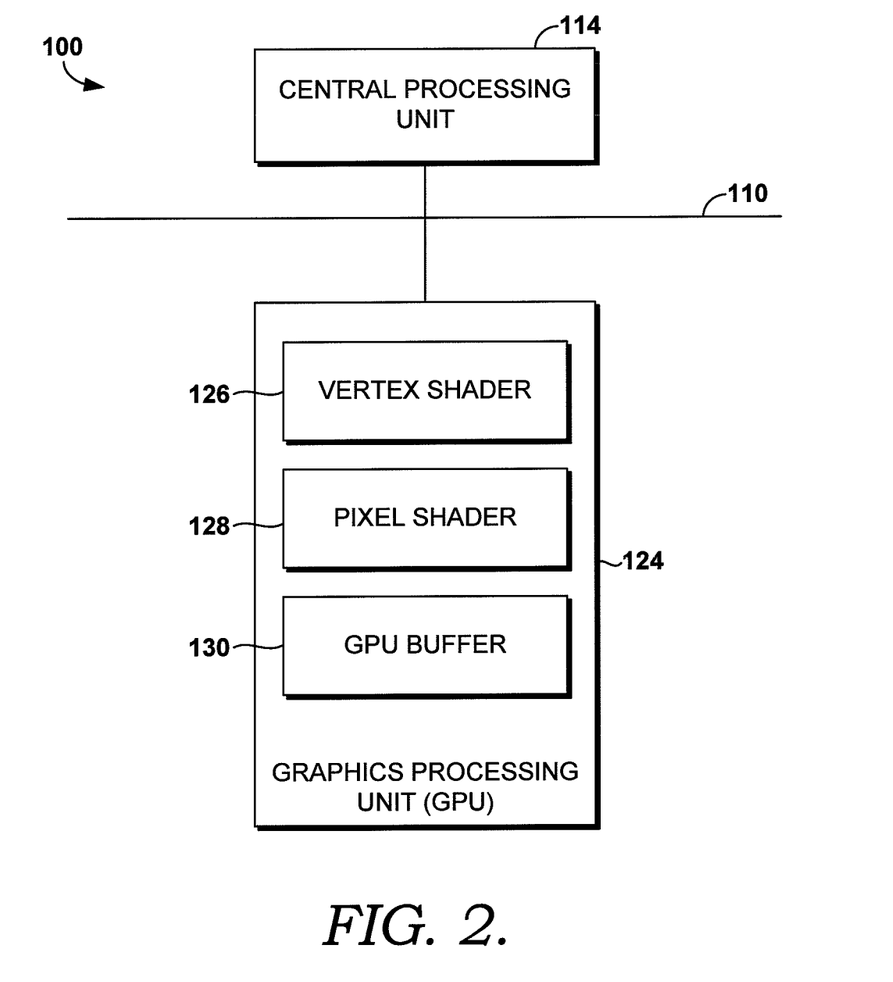
FIG. 2 schematically shows an example of components for rendering text pixels.

FIG. 2 details components of the computing device 100 that may be used for processing a glyph and rendering text. Some of the GPU 124 hardware includes one or more procedural shaders. Procedural shaders are specialized processing subunits of the GPU 124 for performing specialized operations on graphics data. An example of a procedural shader is a vertex shader 126, which generally operates on vertices. For instance, the vertex shader 126 can apply computations of positions, colors and texturing coordinates to individual vertices. The vertex shader 126 may perform either fixed or programmable function computations on streams of vertices specified in the memory of the graphics pipeline. Another example of a procedural shader is a pixel shader 128. For instance, the outputs of the vertex shader 126 can be passed to the pixel shader 128, which in turn operates on each individual pixel. After a procedural shader concludes its operations, the information is placed in a GPU buffer 130, which may be presented on an attached display device or may be sent back to the host for further operation.

The GPU buffer 130 provides a storage location on the GPU 124 as a staging surface or scratch surface for glyph textures. As various rendering operations are performed with respect to a glyph texture, the glyph may be accessed from the GPU buffer 130, altered and re-stored on the buffer 130. As known to those skilled in the art, the GPU buffer 130 allows the glyph being processed to remain on the GPU 124 while it is transformed by a text pipeline. As it is time-consuming to transfer a glyph from the GPU 124 to the memory 112, it may be preferable for a glyph texture or bitmap to remain on the GPU buffer 130.

With respect to the pixel shader 128, specialized pixel shading functionality can be achieved by downloading instructions to the pixel shader 128. For instance, downloaded instructions may enable specialized merging, filtering, or averaging of the glyph texture. Furthermore, the functionality of many different operations may be provided by instruction sets tailored to the pixel shader 128. The ability to program the pixel shader 128 is advantageous for text rendering operations, and specialized sets of instructions may add value by easing development and improving performance. By executing these instructions, a variety of functions can be performed by the pixel shader 128, assuming the instruction count limit and other hardware limitations of the pixel shader 128 are not exceeded.

Figure 3:
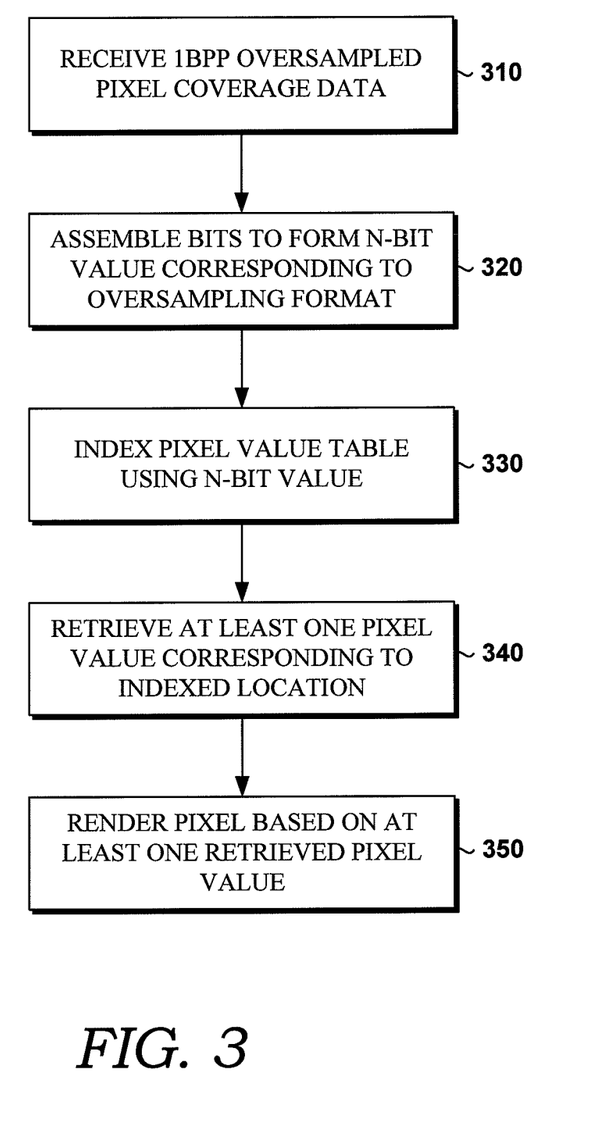
FIG. 3 depicts a flow chart of a method according to an embodiment of the invention.

FIG. 3 depicts a flow chart showing a method according to an embodiment of the invention. In the embodiment shown in FIG. 3, 1-bit-per-pixel coverage data is received 310. The coverage data has an oversampled format, such as a 6×1 format. The received coverage data is stored in a storage format of greater than 1 bit per byte of storage. Bits of coverage data are assembled 320 to form an n-bit value. The n-bit value corresponds to a pixel having the oversampled format, such as a 10-bit value for a 6×1 format. A pixel value table is indexed 330 using the n-bit value. At least one pixel value corresponding to the indexed location is retrieved 340. A pixel is then rendered 350 based on the retrieved at least one pixel value.

Figure 4:
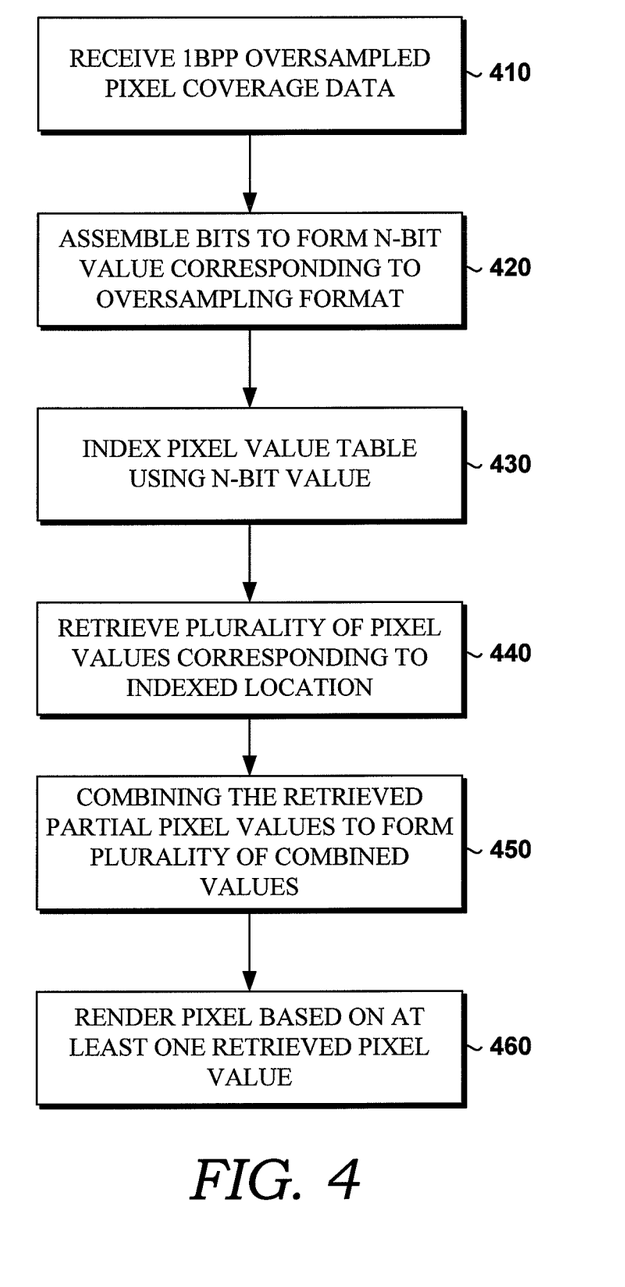
FIG. 4 depicts a flow chart of a method according to an embodiment of the invention.

FIG. 4 depicts a flow chart showing another method according to an embodiment of the invention. In the embodiment shown in FIG. 4, 1-bit-per-pixel coverage data is received 410. The coverage data has an oversampled format, such as a 6×5 format. The received coverage data is stored in a storage format of greater than 1 bit per byte of storage. Bits of coverage data are assembled 420 to form a plurality of n-bit values. Each of the n-bit values corresponds to a portion of a pixel having the oversampled format, such as a group of 10-bit values that are part of pixel coverage data for a 6×5 format. Each of the n-bit values also includes bits from a plurality of bytes. A pixel value table is indexed 430 a plurality of times using the plurality of n-bit values. The same pixel value table can be indexed a plurality of times, or optionally the n-bit values can be used to index more than one pixel value table. A plurality of partial pixel values corresponding to the indexed locations are retrieved 440. The retrieved partial pixel values are combined 450 to form a plurality of combined pixel values. A pixel is then rendered 460 based on the combined pixel values.

Figure 5:
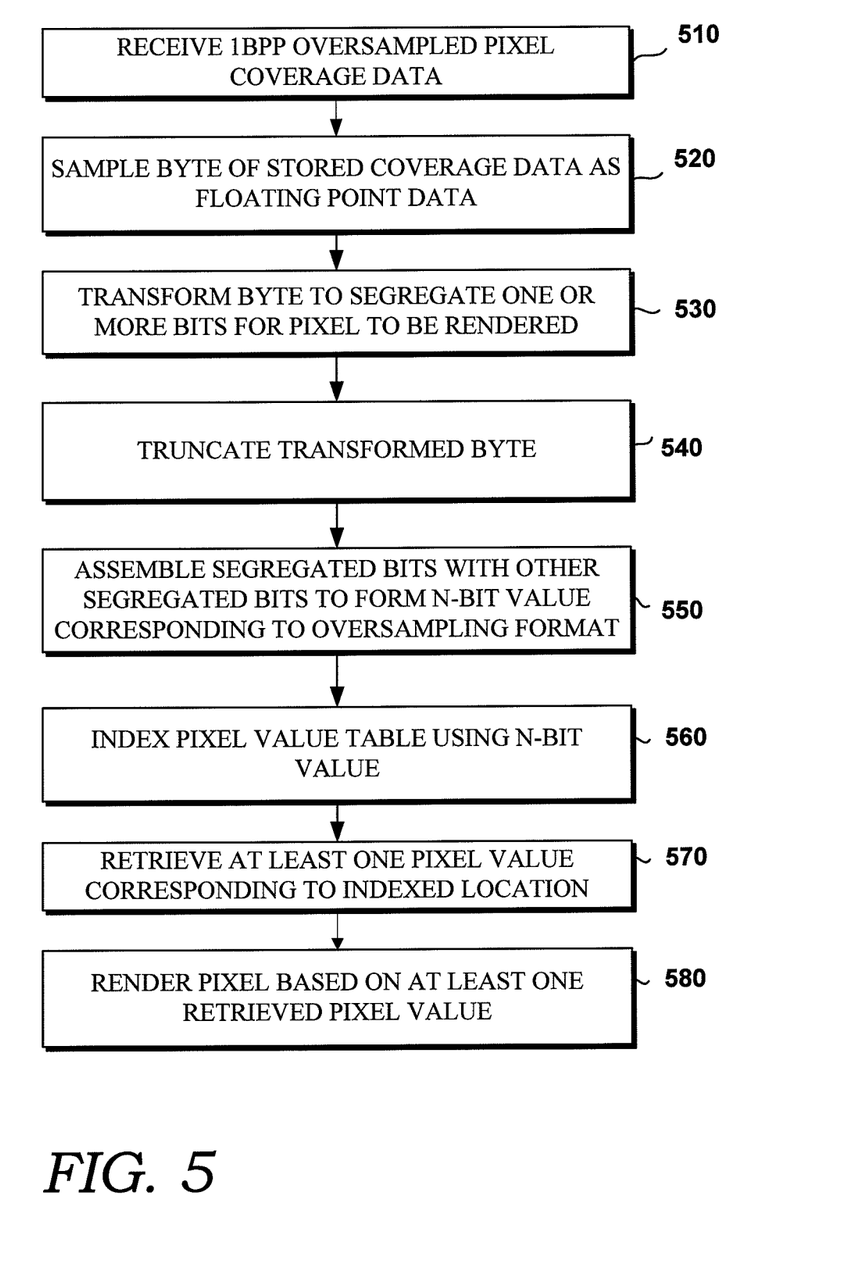
FIG. 5 depicts a flow chart of a method according to an embodiment of the invention.

FIG. 5 depicts a flow chart showing a method according to yet another embodiment of the invention. In the embodiment shown in FIG. 5, 1-bit-per-pixel coverage data is received 510. The coverage data has an oversampled format, such as a 6×5 format. The received coverage data is stored in a storage format of greater than 1 bit per byte of storage. A byte of stored pixel coverage data is sampled 520 as a floating point data type. The byte includes one or more bits corresponding to coverage data for a pixel to be rendered. The sampled floating point byte is transformed 530 to segregate the one or more bits in the stored data. For example, the transformation can be a multiplication by a power of two, so that the bits of interest are segregated on one side of the decimal point for the number. The transformed byte is truncated 540 to remove bits not corresponding to the one or more segregated bits. The segregated bits are assembled 550 with at least one other portion of segregated bits to form an n-bit value corresponding to a pixel having the oversampled format. A pixel value table is indexed 560 using the n-bit value. At least one pixel value is retrieved 570 corresponding to the indexed location. A pixel is then rendered 580 based on the retrieved at least one pixel value.

EXAMPLE

The following is a prophetic example. A change to a display setting is detected for a physical display that is depicting antialiased objects, such as text. The pixels on the physical display are being rendered based on 6×1 oversampled 1 bpp coverage data. The change can be a change in a setting on the physical display device, a change in the color of text to be displayed, or another change. Based on the change, the settings that impact display pixels are detected. The detected settings are compared with the settings for lookup tables stored in an atlas of lookup tables. If a matching group of settings is not found, a new lookup table is created. The lookup table provides the corrected pixel value for each of the possible $2^{10}$ combinations possible for 6×1 coverage data. The corrected pixel value includes the corrections for the pixel value, such as alpha correction, ClearType correction, or any other type of correction. The new lookup table is added to the atlas, and the oldest lookup table in the atlas is removed.

The new lookup table is then used to render objects on the display device, such as text glyphs. The glyphs for display are represented as 6×1 oversampled 1 bpp coverage data. The 1 bpp data is packed by placing 8 bits of data into a byte for transfer from a CPU to a GPU. After transfer to the GPU, the data for each pixel is extracted by accessing the two bytes containing data corresponding to the pixel. Bit shifting operations are used to isolate the bits of interest, and a 10-bit number is formed from the bits of interest. This 10-bit number is then used to index the new lookup table. The stored pixel value corresponding to the 10-bit number is retrieved and used for display. If all corrections are incorporated into the stored value, the stored pixel value may not need any other correction calculations.

Additional Embodiments

In a first embodiment, a method for antialiased rendering is provided. The method includes: receiving 1-bit-per-pixel coverage data having an oversampled format, the received coverage data having a storage format of greater than 1 bit per byte of storage; assembling bits of coverage data to form an n-bit value corresponding to a pixel having the oversampled format; indexing a pixel value table using the n-bit value; retrieving at least one pixel value corresponding to the indexed location; and rendering a pixel based on the retrieved at least one pixel value.

In a second embodiment, a method according to the first embodiment is provided, wherein assembling bits of coverage data to form an n-bit value includes: sampling a byte of stored pixel coverage data as a floating point data type, the byte including one or more bits corresponding to coverage data for a pixel to be rendered; transforming the sampled floating point byte to segregate the one or more bits in the stored data; truncating the transformed byte to remove bits not corresponding to the one or more segregated bits; and assembling the segregated bits with at least one other portion of segregated bits to form an n-bit value corresponding to a pixel having the oversampled format.

In a third embodiment, a method according to any of the above embodiments is provided, wherein the oversampled format for the coverage data is a 6×1 format, the n-bit value corresponding to a 10-bit value.

In a fourth embodiment, a method according to any of the above embodiments is provided, further comprising combining the at least one pixel value with at least a second pixel value to form a combined pixel value, wherein the rendered pixel is based on the combined pixel value.

In a fifth embodiment, a method according to any of the above embodiments is provided, wherein assembling bits to form a plurality of n-bit values comprises assembling bits from a plurality of bytes.

In a sixth embodiment, a method for antialiased rendering is provided. The method includes receiving 1-bit-per-pixel coverage data having an oversampled format, the received coverage data having a storage format of greater than 1 bit per byte of storage; assembling bits of coverage data to form a plurality of n-bit values, each n-bit value corresponding to a pixel having the oversampled format and each n-bit value including bits from a plurality of bytes; indexing a pixel value table a plurality of times using the plurality of n-bit values; retrieving a plurality of pixel values corresponding to each indexed location; combining retrieved pixel values corresponding to a plurality of indexed locations to form a plurality of combined pixel values; and rendering a pixel based on the plurality of combined pixel values.

In a seventh embodiment, a method according to the sixth embodiment is provided, wherein retrieving a plurality of pixel values comprises retrieving three channels of pixel values.

In an eighth embodiment, a method according to the seventh embodiment is provided, wherein combining the retrieved pixel values comprises combining the three channels of pixel values to form three combined channel pixel values.

In a ninth embodiment, a method according to the eighth embodiment is provided, further comprising: indexing a correction factor table using a combined channel value to retrieve a correction factor; and applying the correction factor to the combined channel value.

In a tenth embodiment, a method according to any of the sixth through ninth embodiments is provided, wherein the oversampled format for the coverage data is a 6×5 format, wherein each n-bit value corresponds to a 10-bit value.

In an eleventh embodiment, a method according to any of the above embodiments is provided, wherein the received coverage data has a storage format of at least 8-bits-per-byte.

In a twelfth embodiment, a method according to any of the above embodiments is provided, wherein the 1-bit-per-pixel coverage data represents coverage data for a text glyph.

In a thirteenth embodiment, a method according to any of the above embodiments is provided, further comprising: detecting a change that modifies a pixel correction factor; and constructing a table of pixel values that incorporates the modified pixel correction factor, wherein indexing a pixel value table using the n-bit value comprises indexing the constructed table.

In a fourteenth embodiment, a method according to the thirteenth embodiment is provided, wherein the constructed table is stored in an atlas of tables.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A system for performing antialiased rendering, comprising:
   a processor, an associated display, and an associated memory containing computer-executable instructions, the processor executing the computer-executable instructions contained in the associated memory to provide a system configured to:
receive 1-bit-per-pixel coverage data having an oversampled format, the received coverage data having a storage format of greater than 1 bit per byte of storage;
sample a byte of stored pixel coverage data as a floating point data type, the byte including one or more bits corresponding to coverage data for a pixel to be rendered;
transform the sampled floating point byte to segregate the one or more bits in the stored data;
truncate the transformed byte to remove bits not corresponding to the one or more segregated bits;
assemble the segregated bits of coverage data with at least one other portion of segregated bits to form an n-bit value corresponding to a pixel having the oversampled format, the assembling comprising;
multiplying the truncated, transformed byte by a power of two to modify the location of the segregated bits in the truncated, transformed byte; and
adding the multiplied, truncated, transformed byte to a second byte containing segregated bits, the segregated bits occupying different bit locations in the multiplied, truncated, transformed byte and the second byte;
index a pixel value table using the n-bit value;
retrieve, from the pixel value table, at least one pixel value stored in the pixel value table, the retrieved at least one pixel value corresponding to the indexed location, the retrieved at least one pixel value comprising color information; and
render a pixel on the associated display based on the retrieved at least one pixel value.

2. The system of claim 1, wherein the n-bit value corresponds to a 10-bit value in the oversampled format.

3. The system of claim 1, wherein the received coverage data has a storage format of at least 8-bits-per-byte.

4. The system of claim 1, wherein the 1-bit-per-pixel coverage data represents coverage data for a text glyph.

5. The system of claim 1, the system being further configured to:
detect a change that modifies a pixel correction factor; and
construct a table of pixel values that incorporates the modified pixel correction factor,
wherein indexing a pixel value table using the n-bit value comprises indexing the constructed table.

6. The system of claim 5, wherein the constructed table is stored in an atlas of tables.

7. The system of claim 1, wherein assembling bits to form a plurality of n-bit values comprises assembling bits from a plurality of bytes.

8. A method for antialiased rendering, comprising:
receiving 1-bit-per-pixel coverage data having an oversampled format, the received coverage data having a storage format of greater than 1 bit per byte of storage;
sampling bytes of stored pixel coverage data as a floating point data type, the bytes each including one or more bits corresponding to coverage data for pixels to be rendered;
transforming the sampled floating point bytes to segregate the one or more bits in the stored data;
truncating the transformed bytes to remove bits not corresponding to the one or more segregated bits;
assembling the segregated bits of coverage data to form a plurality of n-bit values, each n-bit value corresponding to a pixel having the oversampled format and each n-bit value including bits from a plurality of bytes, assembling comprising;
multiplying each truncated, transformed byte by a power of two to modify the location of the segregated bits in the truncated, transformed bytes; and
adding the multiplied, truncated, transformed bytes to a second byte containing segregated bits, the segregated bits occupying different bit locations in the multiplied, truncated, transformed byte and the second byte;
indexing a pixel value table a plurality of times using the plurality of n-bit values;
retrieving, from the pixel value table, a plurality of pixel values stored in the pixel value table, the retrieved plurality of pixel values corresponding to each indexed location, the retrieved plurality of pixel values comprising color information;
combining retrieved pixel values corresponding to a plurality of indexed locations to form a plurality of combined pixel values; and
rendering a pixel based on the plurality of combined pixel values.

9. The method of claim 8, wherein retrieving a plurality pixel values comprises retrieving three channels of pixel values.

10. The method of claim 9, wherein combining the retrieved pixel values comprises combining the three channels of pixel values to form three combined channel pixel values.

11. The method of claim 10, further comprising:
indexing a correction factor table using a combined channel value to retrieve a correction factor; and
applying the correction factor to the combined channel value.

12. The method of claim 8, wherein each n-bit value corresponds to a 10-bit value.

13. The method of claim 8, wherein the received coverage data has a storage format of at least 8-bits-per-byte.

14. The method of claim 8, wherein the 1-bit-per-pixel coverage data represents coverage data for a text glyph.

15. The method of claim 8, wherein assembling bits to form a plurality of n-bit values comprises assembling bits from a plurality of bytes.

16. A method for rendering text, comprising:
receiving 1-bit-per-pixel coverage data having an oversampled format, the received coverage data having a storage format of greater than 1 bit per byte of storage;
sampling a byte of stored pixel coverage data as a floating point data type, the byte including one or more bits corresponding to coverage data for a pixel to be rendered;
transforming the sampled floating point byte to segregate the one or more bits in the stored data;
truncating the transformed byte to remove bits not corresponding to the one or more segregated bits;
assembling the segregated bits with at least one other portion of segregated bits to form an n-bit value corresponding to a pixel having the oversampled format, the assembling comprising:
multiplying the truncated, transformed byte by a power of two to modify the location of the segregated bits in the truncated, transformed byte; and
adding the multiplied, truncated, transformed byte to a second byte containing segregated bits, the segregated bits occupying different bit locations in the multiplied, truncated, transformed byte and the second byte;

indexing a pixel value table using the n-bit value;

retrieving at least one pixel value corresponding to the indexed location; and rendering a pixel based on the retrieved at least one pixel value.

17. The method of claim 16, wherein transforming the sampled floating point byte comprises multiplying the value in the byte by a power of two to segregate the one or more bits corresponding to a pixel to be rendered relative to a decimal point.

18. The method of claim 16, wherein the the n-bit value corresponds to a 10-bit value in the oversampled format.

19. The method of claim 16, further comprising combining the at least one pixel value with at least a second pixel value to form a combined pixel value, wherein the rendered pixel is based on the combined pixel value.

20. The method of claim 16, wherein the 1-bit-per-pixel coverage data represents coverage data for a text glyph.

\* \* \* \* \*